Oct. 14, 1941.          R. B. FERREBY          2,258,601
                         WAVING SIGN
                      Filed Nov. 22, 1937        6 Sheets-Sheet 1
Fig. 2.
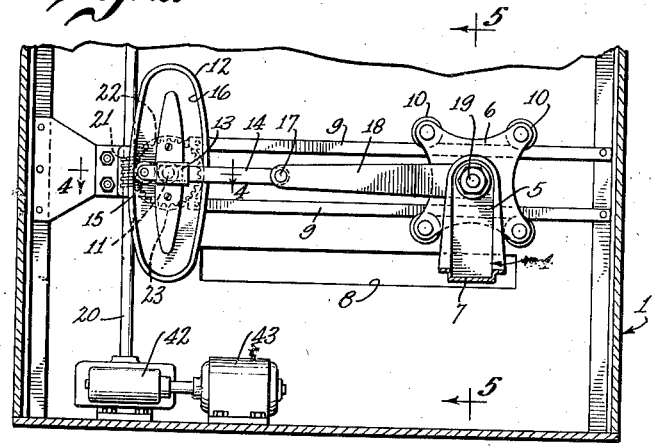
Fig. 3.
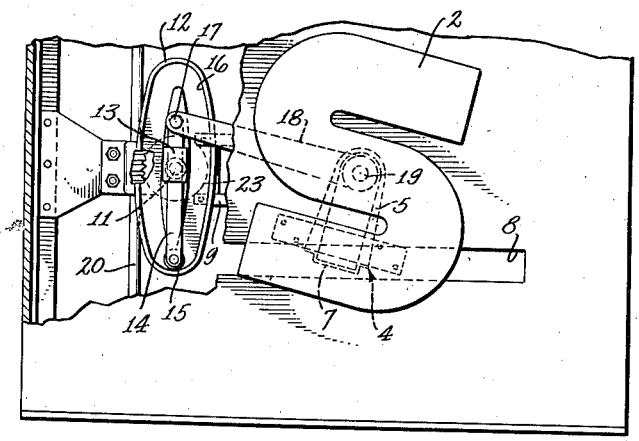
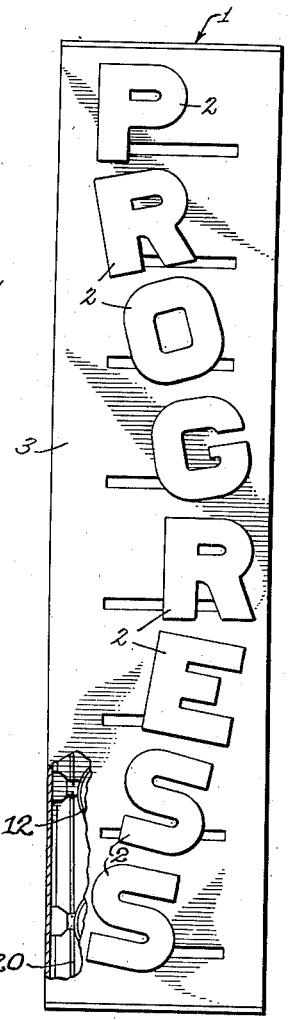
Fig. 1.
Fig. 4.
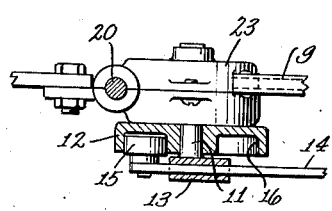
Inventor
Rolla B. Ferreby
By Lyon & Lyon
Attorneys Oct. 14, 1941.  R. B. FERREBY  2,258,601
WAVING SIGN
Filed Nov. 22, 1937  6 Sheets-Sheet 3

Inventor
Rolla B. Ferreby
By Lyon & Lyon
Attorneys

Oct. 14, 1941.    R. B. FERREBY    2,258,601
WAVING SIGN
Filed Nov. 22, 1937    6 Sheets-Sheet 4

Inventor
Rolla B. Ferreby
By Lyon & Lyon
Attorneys

Oct. 14, 1941.    R. B. FERREBY    2,258,601
WAVING SIGN
Filed Nov. 22, 1937    6 Sheets-Sheet 5

Inventor
Rolla B. Ferreby
By Lyon & Lyon
Attorneys

Oct. 14, 1941.        R. B. FERREBY        2,258,601
WAVING SIGN
Filed Nov. 22, 1937        6 Sheets—Sheet 6

Inventor
Rolla B. Ferreby
By Lyon & Lyon
Attorneys

Patented Oct. 14, 1941

2,258,601

UNITED STATES PATENT OFFICE 2,258,601

WAVING SIGN

Rolla B. Ferreby, Los Angeles, Calif.

Application November 22, 1937, Serial No. 175,769

18 Claims. (Cl. 40—139)

This invention relates to moving signs, and particularly to the type of sign in which the parts composing a figure or word, are capable of lateral movement.

One of the objects of the invention is to produce a sign of this character, in which the parts are so controlled that in reciprocating them across the sign, they will be tilted progressively so as to obtain the effect of a wave passing through the sign.

Another object of the invention is to provide simple mechanism for effecting the reciprocation of the letters, and which will operate in such a way that when a letter arrives at the end of its travel and commences to return, it will be tilted in an opposite direction from that in which it was tilted when the letter arrived at the end of its travel, thereby enabling a true wave effect to be attained in the operation of the sign.

A further object of the invention is to provide simple mechanism for moving the letters composing a word, so as to attain the effect of a wave passing through a word, and at the same time, to maintain each letter so that its vertical axis is substantially at right angles to the axis of the wave, in the case of a horizontal sign; and in which the vertical axis of each letter in a vertical sign will be maintained substantially parallel with the longitudinal axis of the wave.

A further object of the invention is to provide a mechanism for reciprocating and tilting the letters of a horizontal sign, which readily adapts itself for effecting the counterbalancing of the weight of the letters.

One of the objects of the invention as applied to the vertical type of sign, is to provide efficient means for suspending the letters, operating to reduce materially the friction which might be developed in reciprocating and tilting the letters.

A further object of the invention is to provide a sign of this character, in which simple cam mechanisms are provided for effecting the progressive reciprocation and tilting of the letters to attain the effect of a wave passing through the word formed by the letters.

A further object of the invention is to provide a simple mechanism capable of being employed below the level of the sign for imparting a vertical reciprocating movement to the letters of the sign, and at the same time, a tilting movement to attain a wave effect in the operation of the sign.

Further objects of the invention will appear hereinafter.

The invention consists in the novel parts and combination of parts to be described hereinafter, all of which contribute to produce an efficient waving sign.

A preferred embodiment of the invention is described in the following specification, while the broad scope of the invention is pointed out in the appended claims.

In the drawings:

Fig. 1 is a front elevation of the sign embodying my invention, and showing the letters disposed along a wave line such as the letters will assume in the operation of the sign.

Fig. 2 is a vertical section taken at the lower end of the frame or casing of the sign illustrated in Fig. 1. This view is upon an enlarged scale and illustrates a type of cam mechanism which I may employ for effecting the reciprocation of the letters and the tilting thereof to attain a wave effect. In this view certain parts are broken away.

Fig. 3 is a view corresponding to Fig. 2, and is a partial elevation of the outer side of the same with part of its frame plate broken away so as to illustrate the driving mechanism for the letter in a different position from that illustrated in Fig. 2.

Fig. 4 is a horizontal cross-section upon an enlarged scale, taken about on the line 4—4 of Fig. 2, and further illustrating details of the driving mechanism.

Figure 14:
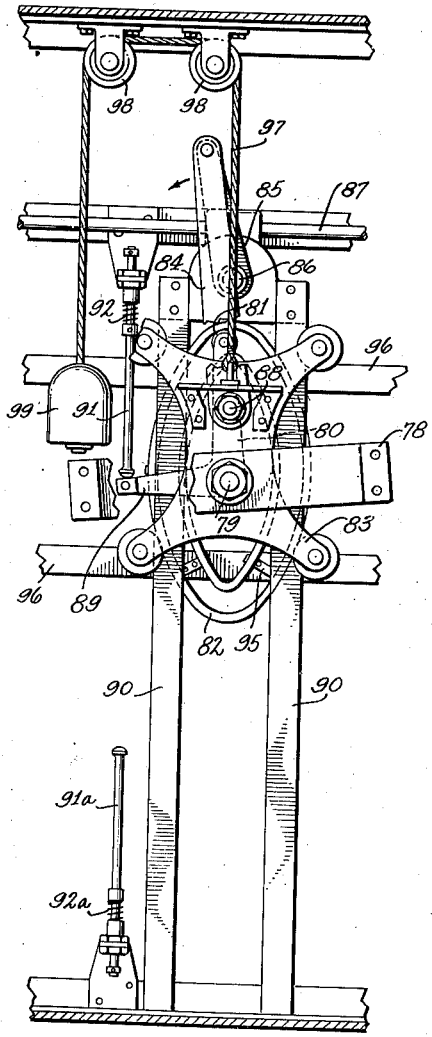

Fig. 14 is a vertical section through a horizontal type of sign, and illustrating another embodiment of the mechanism for reciprocating a letter, and for tilting the same; and this view also illustrates an elongated cam construction with means to cooperate with the driving mechanism to facilitate the passage of the cam roller along the cam at its ends. This view also illustrates another type of counterbalancing means.

Figure 15:
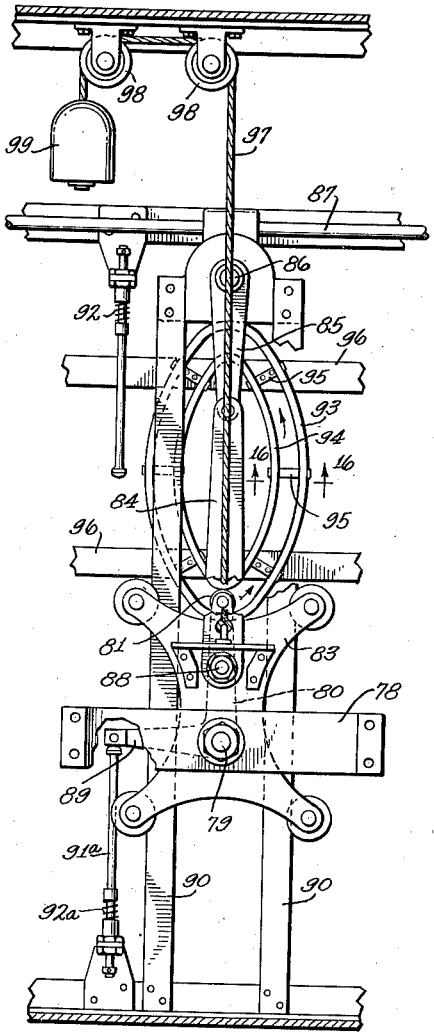

Fig. 15 is a view similar to Fig. 14, but showing the mechanism in a different position, and further illustrating the action of the urging means that urges the cam roller forward at the lower end of the cam.

Figure 16:
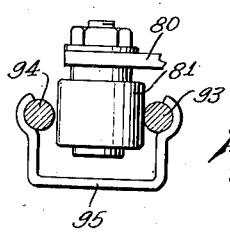

Fig. 16 is a horizontal cross-section upon an enlarged scale, taken on the line 16—16 of Fig. 15, and illustrating a self-cleaning type of cam, which may be employed in the constructions illustrated in Figs. 14 and 15.

Figures 17, 18:
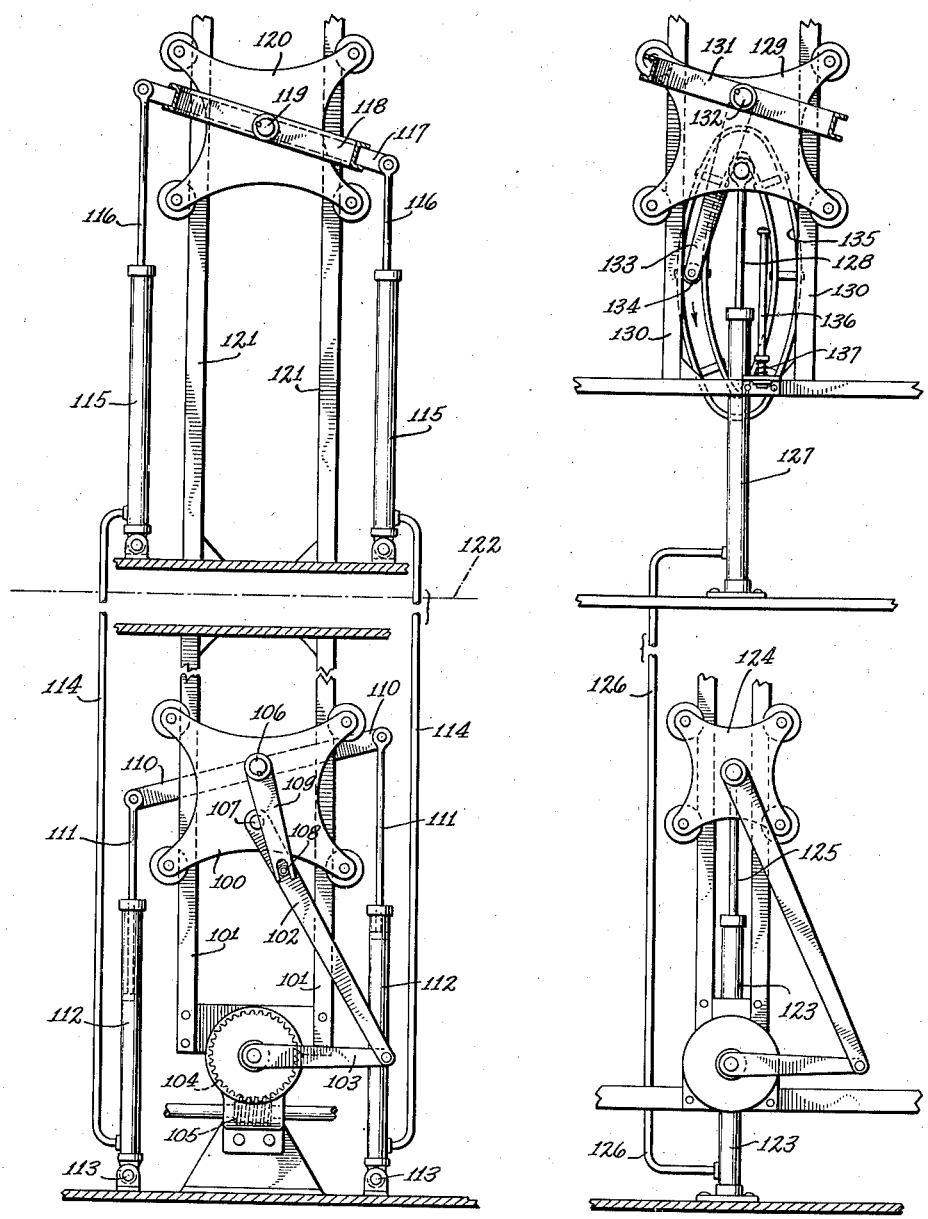

Fig. 17 is a front elevation of mechanism showing the bottom plate of a horizontal sign in section, and particularly illustrating a construction that may be employed for vertically reciprocating and tilting the letters of a horizontal sign to attain a wave effect, and also illustrating how such a mechanism can be employed from a position below this sign to control the letters of the sign.

Fig. 18 is a view of the same nature as Fig. 17, but illustrating another embodiment of mechanism for enabling the letters of the sign to be controlled from a point below the sign; at the same time, enabling the reciprocating and tilting effect to be imparted to the letters to attain the desired wave effect through the word formed by the letters.

Before proceeding to a detailed description of this invention, it should be stated that it involves the construction of signs such as street signs, or advertising signs, and is applied to a type of sign in which the letters composing the words are independently movable. In accordance with the invention, the letters composing a word are capable of progressive movement in a lateral direction with respect to the direction in which the word extends, and during this lateral movement the letters are tilted progressively so as to attain the effect of a wave passing longitudinally through the word. In the construction of vertical signs, the letters, of course, move in a horizontal direction, and it is unnecessary to counterbalance them. In horizontal signs, however, the letters are counterbalanced.

In practicing the invention, the letters are mounted so that they are capable of tilting on an axis. As each letter moves through its transverse travel, it is tipped progressively, and when a letter arrives at the end of its travel in one direction it, of course, commences to move in the opposite direction and is progressively tilted in a reverse manner.

In Figs. 1–3 inclusive, I illustrate an embodiment of the invention as applied to a vertical sign. This sign has a casing 1 for housing the mechanism for driving the letters 2, said letters being exposed at a face plate or frame plate 3, which preferably forms a forward wall of the casing. The letters 2 are supported on letter brackets 4 respectively. Each of these brackets preferably includes an inner arm 5 that is mounted to tilt on a reciprocating carriage 6. Each bracket includes a pair of arms 7, which extend out respectively through slots 8 in the face plates 3. In this connection it should be understood that a vertical sign usually projects out from the front of a building, and with this type of sign it is feasible to provide two face plates 3 and two sets of letters spelling a word, disposed on opposite sides of the sign.

The carriage 6 is guided to slide on suitable guide means, preferably comprising two or more guide bars 9 disposed in a substantially horizontal position, and the carriage 6 is preferably provided with anti-friction rollers 10 running on these bars.

In order to reciprocate the carriage and at the same time provide for tilting each letter, I provide a rotary shaft 11 (see Figs. 2, 3 and 4) which shaft extends through the center of a fixed cam 12, the end of the shaft being provided with a guide sleeve 13 through which a cam bar 14 slides freely. This cam bar constitutes a cam follower and preferably includes a roller 15 at its inner end, that rolls in the race-way 16 of the cam. The cam for a vertical sign is elongated on its vertical diameter, preferably substantially as indicated in Figs. 2 and 3. The end of the cam bar remote from the roller is attached by a pivot pin 17 to a connecting rod 18, and this connecting rod is attached at its outer end to the carriage 6 for pivotal movement, and is rigidly connected to the letter bracket 4.

By reason of the sliding connection between the cam bar 14 and the guide sleeve 13, it will be evident that the letter carriage 6 will be given a relatively long transverse movement or travel across the frame of the sign, but the angularity of the rod 18 is greatly reduced when the carriage is in a substantially mid position, as indicated in Fig. 3. This reduces the degree of tilting of the letter, which is necessary.

The mechanism illustrated in Figs. 2 and 3, is provided to correspond with each letter, and the parts are all assembled so that the mechanisms driving the letters are in different phases, that is to say, these mechanisms operate to progressively reciprocate the letters in a graduated way. In other words, in any instant, the letter "R" for example, of the sign "PROGRESS" will have its carriage advanced out of line with the letter "P" but not quite as far advanced as the next letter "O" of the sign. The letter "R" will be tilted but not as greatly as the letter "O." In other words, these mechanisms control the letters so that the effect is attained of a wave passing through the word.

Any means may be employed for effecting the tilting of the letter through the agency of the connecting rod 18. In the present instance the connecting rod is rigidly secured to a pin 19 that rotates freely in the carriage 6, and this pin is rigidly secured to the arm 5 of the letter carriage.

Any suitable means may be employed for driving the shafts 11 that actuate the letters. In the present instance, this is accomplished by providing a worm shaft 20 extending longitudinally within the casing 1 and having a worm 21 corresponding to each letter. Each of these worms 21 drives a worm wheel 22 housed in a suitable casing 23 and rigidly connected with the shaft 11 that has its bearing in the casing. The cam 12 is supported on the casing 23 and the casing 23 is supported on a bracket at its left as illustrated in Fig. 4.

Figure 6:
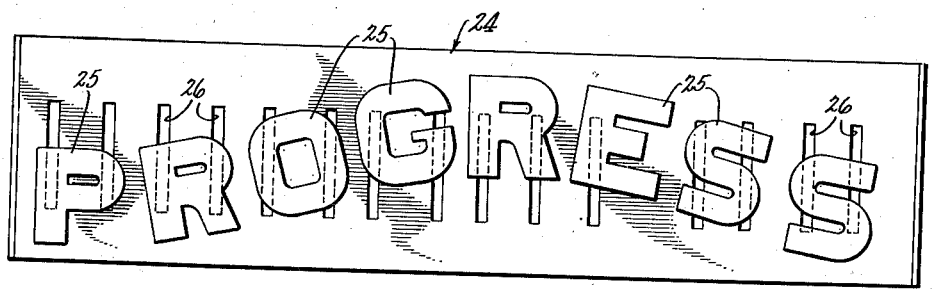
Fig. 6 is a front elevation of a sign of horizontal type, and illustrating the letters forming the word extending along a wave line.
Figure 7:
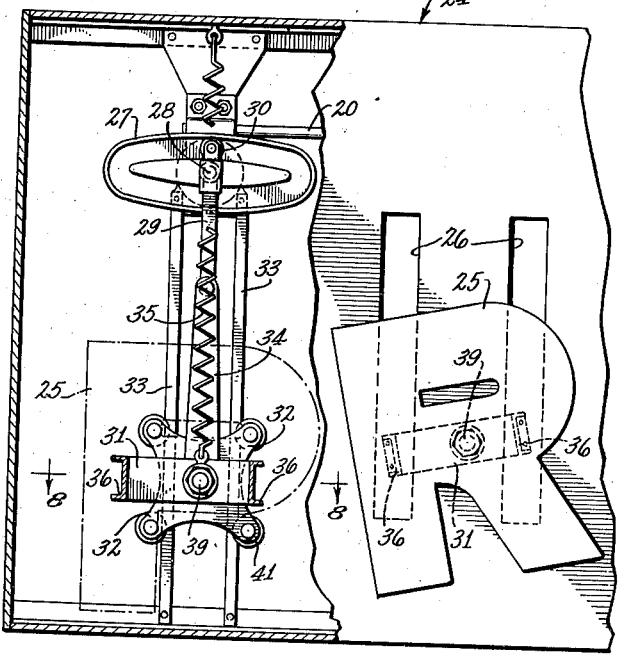
Fig. 7 is a front elevation of the left end of the sign shown in Fig. 6 upon an enlarged scale, certain parts being broken away and others shown in section. In this view a portion of the face plate of the sign is broken away to disclose the driving mechanism for the first letter of this sign.
Figure 8:
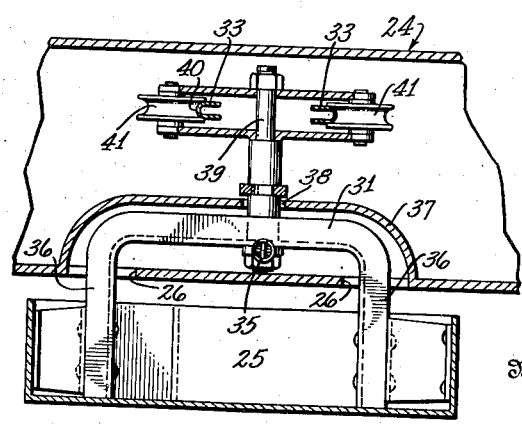
Fig. 8 is a horizontal section upon an enlarged scale taken about on the line 8—8 of Fig. 7, certain parts being broken away.

In Figs. 6, 7 and 8, I illustrate the invention as applied to a horizontal sign having a casing 24 carrying letters 25 on its forward face, which are guided to move transversely to the direction in which the word extends, that is to say, transversely to the longitudinal axis of the sign casing, 24. In the present instance, instead of having a single slot through the face plate of the sign casing, I may provide two slots 26 corresponding to each letter. This will enable a more secure attachment to the backs of the letters to be effected. The mechanism illustrated in Figs. 6, 7 and 8 is substantially the same as that indicated in Figs. 1-4 inclusive, that is to say, I provide a fixed cam 27 at the center of which a guide sleeve 28 rotates on an axis at right angles to the plane of the cam, said guide sleeve 28 operating to rotate a cam rod 29 through the agency of the cam wheel 30 running in the cam. Fig. 7 illustrates the mechanism in an extreme position with the letter "P" carried by the letter bracket 31 in its most depressed position. As the sleeve 28 rotates the letter carriage 32 reciprocates in a vertical direction, being guided on the guide bars 33. The weight of the carriage and the connecting rod 34 and cam bar 29, is counterbalanced in the present instance by means of a coil spring 35. The action of this mechanism is the same as the mechanism illustrated in Figs. 1-3, except that the direction in which the letters reciprocate is vertical instead of horizontal. However, the same tilting effects for the letters are obtained, and the momentum of the parts in a downward movement is counterbalanced by the coil spring 35 attached at its upper end to the upper wall of the casing and attached at its lower end to the letter bracket.

Referring to Fig. 8, in the present instance the letter bracket 31 has two arms 36 that project respectively through the slots 26, that attach to the letters 25. If it is desired to conceal the presence of the slots 26 or 8, this can be accomplished by means of a screen plate such as the screen plate 37 (see Fig. 8), which is of diskform and which extends across the back of the face plate of the sign between the remote edges of each pair of slots 26 corresponding to each letter. These screen plates, of course, should have slots 38 parallel with the slots in the face of the sign to make clearance for the pin 39 to which the connecting rod 34 is rigidly attached, and which rigidly carries the letter bracket 31.

Figure 5:
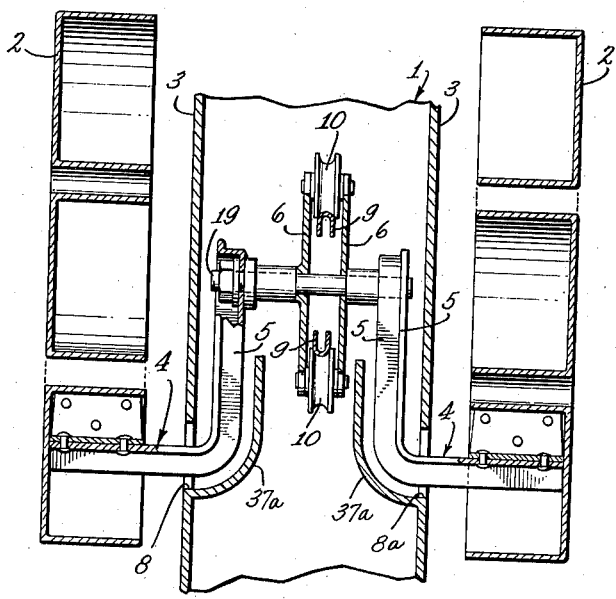
Fig. 5 is a vertical section upon an enlarged scale taken about on the line 5—5 of Fig. 2, and further illustrating details of the sign construction.

In Fig. 5 I illustrate the double-sided construction for the sign referred to above, but with single slots 8a in the face plates of the sign corresponding to the construction illustrated in Fig. 1. These slots 8a may be covered on the inside by shields 37a corresponding to the shields 37 of Fig. 8.

The guide bars that guide the letter carriages are preferably formed of U cross-section, so as to present convex outer faces 40 (see Fig. 8) against which the faces of the guide rollers 41 rest. This gives considerable strength with lightness to these guide cars.

In all types of this sign, the drive shaft such as the shaft 20 for driving the letter actuating mechanisms, may be actuated through a reduction gear 42 driven by an electric motor 43 (see Fig. 2). However, it should be understood that any other source of power may be employed.

In Figs. 9 to 12 inclusive, I illustrate another embodiment of invention to reduce the friction of driving the letters to and fro, and tilting the same. In this construction the letter carriage 44 is composed of a body 45 and a slide 46. The body 45 is mounted on rollers 47 to run on guide bars 48. The slide 46 carries the weight of the letter, which letter is attached to the letter bracket 49. This slide 46 operates as a hanger for imparting the weight of the letter bracket and letter to the upper rollers 47a of the four rollers 47, and for this purpose the upper end of the slide 46 carries a rigid hanger bar 50 that rests on the upper sides of the rollers 47a. In this mechanism I also dispense with the use of the rotary guide sleeves such as shown at 28 in Fig. 7, and I provide a crank arm 51 attached rigidly to the shaft 52 of the worm wheel 53 which is driven from the worm shaft 54. The end of this crank arm 51 is pivotally attached to a connecting rod 55, and this connecting rod is attached by a pivot pin 56 to the slide 46. This will effect the reciprocation of the letter bracket which is carried on the slide 46. Through the medium of a point on the connecting rod removed from the pivotal connection 56, I effect the tilting of the letter bracket 49. This letter bracket is rigidly attached to the rock shaft 57 (see Figs. 10 and 11) said rock shaft having a rigid arm 58 with a slot 59 in its outer end, which is engaged by a pin 60 carried on a short arm 61 projecting laterally from the end of the connecting rod that is adjacent to the slide. With this arrangement it will be evident that the angular movement imparted to the letter attached to the letter bracket 49, will be considerably less than the angular movement of the connecting rod 55. This enables a letter to have the desired travel in reciprocating, but reduces the tilting of the letters to practical limits.

Figure 10:
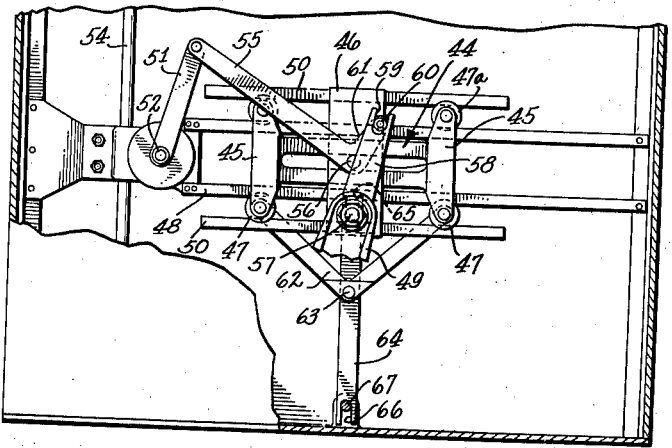
Fig. 10 is a view similar to Fig. 9, but illustrating mechanism in an intermediate position instead of at the end of travel of the letter as in Fig. 9.
Figure 11:
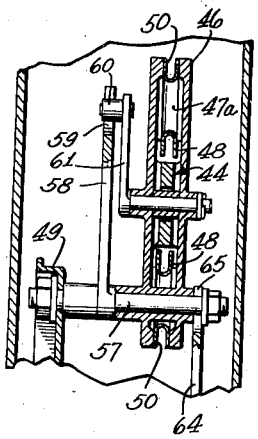
Fig. 11 is a vertical section taken about on the line 11—11 of Fig. 9 upon an enlarged scale, certain parts being broken away.
Figure 12:
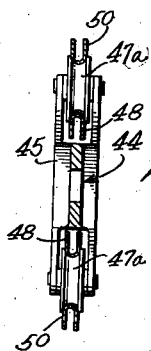
Fig. 12 is a section through the letter carriage, taken on the line 12—12 of Fig. 9.

With the mechanism just described, it is desirable to provide means for maintaining the slide 46 in a mid position relation with respect to the body 45 when the slide should be in its mid position relation, as illustrated in Fig. 10. In other words, I provide a mechanism to prevent any creeping movement of this slide 46 toward one end or the other of the wheeled body 45. Any suitable means may be provided for this purpose. In the present instance, I provide the lower side of the body 45 with a bracket 62 formed of two links connected by a pin 63, which operates as a rocking axis for a lever 64. The upper end of this lever has a yoke 65 that engages the rock shaft 57, and the lower end has a similar yoke 66 that engages a pin 67 fixed in line with the mid point of the travel of the carriage. With this arrangement it will be evident that the slide can move freely to and fro, but cannot creep in either direction with respect to the body 45.

Figure 13:
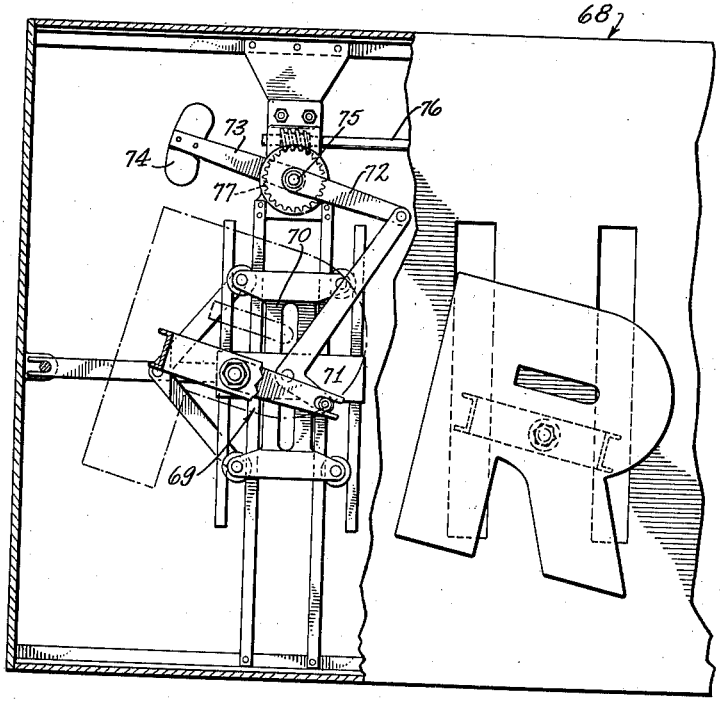
Fig. 13 is a view similar to Fig. 7, but illustrating another embodiment of the mechanism, illustrating counterbalancing means for the letter.
Figure 9:
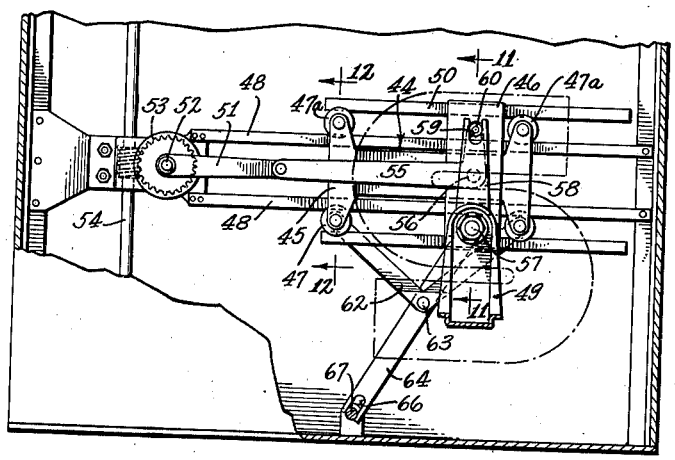
Fig. 9 is a view somewhat similar to Fig. 2, but illustrating another embodiment of the invention as regards the means for effecting the tilting of the letter.

Fig. 13 illustrates the same type of mechanism that is illustrated in Figs. 9 and 10, but applied to a horizontal sign 68. Each letter of this sign carries mechanism 69 for the letter, and in order to counterweight the carriage body 70, the slide 71 and parts carried thereby, the crank 72 is counterweighted by means of a tail arm 73 carrying a counterweight 74. A shaft 75 carrying the crank arm 72 is driven continuously through a worm shaft 76 and worm wheel 77. This mechanism performs in exactly the same way as that illustrated in Figs. 9 and 10, except that it reciprocates the letter in a vertical direction and provides for counterweighting the mechanism and the letter.

In Figs. 14 and 15 I illustrate a cam-controlled type of drive for the sign having some similarity to the cam driving mechanism illustrated in Figs. 2 and 3, but as illustrated in Figs. 14 and 15, I provide means for urging the cam roller around the ends of the cam. This insures easy operation of the mechanism. It should be understood that Figs. 14 and 15 illustrate the same mechanism, but Fig. 14 illustrates the carriage in a position where the cam roller is being urged across the upper end of the cam; and Fig. 15 shows the cam roller being urged across the lower end of the cam. The direction of rotation is anticlockwise; in this construction 78 indicates the letter bracket which is rigidly secured ot a rocking pin or rock shaft 79, said rock shaft being rigidly attached to a bell crank lever having a cam arm 80 with a roller 81 to run in the runway of the cam 82. The carriage 83 is reciprocated by means of a connecting rod 84 connected at its upper end to a crank arm 85 rigid with the shaft 86 of a warm wheel driven by the worm shaft 87. The lower end of the connecting rod is attached by a pivot pin 88 to the carriage 79 above the location of the letter bracket 78. The bell crank lever referred to above as having the arm 80, also has an arm 89. As the carriage is guided in its reciprocation on the guide bars 90, the cam roller 81 runs around in the cam, thereby imparting tilting movement to the letter bracket through the rocking pin 83. When the carriage is arriving at the upper limit of its travel, the arm 89 engages a bumper pin 91, which is in the form of a long stem pressed outwardly by a coil spring 92. This spring becomes compressed as the roller 81 arrives at the upper end of its travel in the cam, and at the highest point of the cam roller's travel the spring exerts its force to give an impulse or urge to the roller over toward the left side of the cam, as viewed in Fig. 14. At the lower end of the travel of the carriage, the arm 89 strikes a similar bumper pin 91a having a spring 92a. This spring 92a is compressed in the same manner as the spring 92, and operates to urge the cam roller across to the right side of the cam. In Fig. 15 the arm 89 is illustrated in engagement with this bumper.

Figs. 14 and 15 also illustrate a different type of cam which I may employ to attain a self-cleaning effect for the cam. Instead of making this cam out of plate channel-form, the cam is formed of round iron or steel bars including an outer bar 93 and an inner bar 94. The cam roller 81 is of plain cylindrical form. These bars 93 and 94 are connected together by offset bars 95 that are rigidly secured to their outer sides with respect to the roller. Certain of these brace bars may be secured to horizontal frame bars 96 (see Fig. 15). In the horizontal sign in which the letters reciprocate vertically, the carriage and the letter, and the attached parts, can be counterweighted by means of a cord 97 attached to the carriage and extending upwardly and over two sheaves 98 beyond which the pendant end of the cord carries a counterweight 99.

In Figs. 17 and 18 I illustrate a use of my invention to control the letters of a sign from a remote point, and preferably from a point just below the sign. This adaptation of the invention is particularly useful in a situation where, for example, a sign is carried above a fire-wall of a building, with a mechanism for controlling the letters of the sign mounted on the roof just back of the fire-wall. In this construction, and referring to Fig. 17, I provide a carriage 100, which is reciprocated in a vertical direction on guide bars 101, through the medium of a connecting rod 102 attached to a crank 103 driven through a worm wheel 104 and worm 105. The carriage 100 carries a rocker pin 106 mounted to rock on the same above the pivot pin 107 that attaches the connecting rod to the carriage. This rocker pin 106 is rocked through a decreased angle by means of a connection to a point on the rod 102 removed from the pivot pin 107. In the present instance, I provide a small roller 108 on the side of the connecting rod that engages a yoke or fork end on an actuating lever 109 that is rigid with the rocker pin 106. Also rigid with this rocker pin there is provided a double-armed rocker lever 110 pivotally carrying the rods 111 of pistons, which pistons reciprocate respectively in two barrels 112, the lower ends of said barrels being pivotally supported on pivot pins 113. With this construction, as the rocker 110 rocks to and fro, it will alternately force fluid out of the cylinders and up through two hose 114, said hose being attached to the lower ends of barrels 115 similar to the barrels 112, and these barrels carry pistons with rods 116 pivoted to the rocker 117 that is rigid with a letter bracket 118 rigid on a rocking pin 119 that attaches the rocker and the letter bracket on the letter carriage 120, said letter carriage being guided vertically on suitable guide bars 121. With this arrangement the letter bracket 118 will have substantially the same movements imparted to it that are described by the rocker 110, but the direction of these movements will be reversed. This, of course, is of no consequence because the same reversal will apply to all the letters of the sign.

With this construction the barrels 115 may be located above the upper edge of the fire-wall indicated by the dotted line 122.

It will be evident that if it is not necessary to provide for a remote control of the letters of the sign, the letter bracket could be attached directly to the rocker 110.

In Fig. 18 I provide for a remote control similar to that illustrated in Fig. 17, but requiring a single barrel or pump 123. In this construction the carriage 124 reciprocated in the same manner as illustrated in Fig. 17, operates the piston 125 of the fixed pump barrel 123. The lower end of the pump barrel 123 is connected by a hose 126 to the lower end of a similar pump barrel 127. The alternate rise of the operating fluid in the barrel 127 will reciprocate the piston rod 128, which rod is pivotally attached to a carriage 129, which reciprocates on the vertical guide bars 130. At a point on the carriage 129 a letter bracket 131 is pivotally mounted on a suitable rocker pin 132, said rocker pin being rigid with a cam arm 133 carrying a roller 134 running in a vertical elongated cam 135. The direction of travel is anti-clockwise. If desired, means may be provided for urging the roller 134 along the cam at the upper and lower end of its travel. For this purpose a bumper 136 would be provided, which is resiliently urged in an upward direction by a coil spring 137. At the limit of the downward travel of the roller 134, the head of this bumper 136 will be engaged by the lower edge of the letter bracket 131, thereby compressing the spring, and as soon as the roller 134 has arrived at the extreme lower end of the cam, the spring 137 will exert an upward thrust on the bumper 137 that will carry the roller 134 over into the right side of the cam. A similar bumper can be provided, if desired, for the upper end of the cam, but this is hardly necessary because the action of gravity will assist in getting the roller across the upper end of the cam.

The general mode of operation of the invention will now be stated:

In the embodiment illustrated in Figs. 1-3, the rotation of the shaft 11 (see Fig. 4) rotates the sleeve 13 and causes the cam roller 15 to travel around in the cam 16, thereby varying the virtual length of the crank constituted by the portion of the cam bar between the pivot pin 17 and the shaft 11. In this way the connecting rod 18 will cause the reciprocation of the carriage 6 carrying the letter of the sign, but at the same time, reducing the tilting angle of the letter which is carried on the letter bracket 4, and which is rigid with the pin 19. As this pin 19 is also rigid with the connecting rod 18, the tilting of the letter, of course, corresponds to the angularity of the connecting rod 18. The construction shown in Figs. 6, 7 and 8, is substantially similar to this, and has substantially the same mode of operation except that the weight of the letter bracket and letter and attached parts, is counterweighted by means of the coil spring 35. It is understood, of course, that if desired, instead of using a spring for this purpose, a counterweight may be employed such as illustrated in Fig. 13, or as illustrated in Figs. 14 and 15.

In the construction illustrated in Figs. 9-12, the rotation of the crank 51 reciprocates the letter carriage, and as the angular position of the connecting rod 55 changes, its short arm 61 rocks the lever arm 58, which is rigid with the letter bracket 49. In this embodiment of the invention, the weight of the letter bracket and letter, is carried on the reciprocating slide 46 to which the connecting rod 55 is attached, and the bar 50 carried by this slide rests on the upper sides of the upper pair of rollers 47a. The rollers 47a, of course, roll on the upper one of the horizontal guide bars 48. This arrangement reduces friction. The body 45 carrying the rollers 47, is maintained against creeping toward one end or the other, by means of the lever 64 that maintains it in a mid position whenever the slide 46 is in mid position, as illustrated in Fig. 10.

In Fig. 13, the construction is substantially the same as in Figs. 9 and 10, and the sign has the same mode of operation except that Fig. 13 shows a horizontal type of sign, and the letter bracket and attached parts are counterweighted by the counterweight 74.

In the construction shown in Figs. 14 and 15, the letter carriage is reciprocated in a vertical direction by the crank 85 and connecting rod 84, and as this takes place the roller 81 carried on the arm 80, traveling around in the cam, operates to tilt the letter bracket 78. At the ends of the travel, the arm 89 strikes the bumpers 91 and 91a respectively, and the springs of these bumpers urge the roller 81 to cross the vertical axis of the cam. The weight of the letter bracket, letter, and attached parts, is counterbalanced by the counterweight 99.

In the operation of the mechanism shown in Fig. 17, as the carriage 100 reciprocates, the connecting rod 102 tips the rocking pin and rocker 110, thereby alternately operating the pump cylinders 112 that operate the cylinders 115 to rock the rocker 117, and also reciprocate the same. The movements of the pistons 116 not only determine the tilting of the letter bracket 118, but also the vertical travel of the same.

In Fig. 18 the remote control attained by the construction shown in Fig. 17, is obtained through the medium of a single hose and a single cylinder 127 at the sign. The cylinder 127 reciprocates the carriage 129 and the reciprocation of this carriage through the medium of the cam arm 133, rocks the letter bracket 131.

It is evident that a sign embodying this invention will attract attention in the day time as well as at night. The faces of the letters should, of course, be of a color to contrast well with the color of the casing back of the letters.

The faces of the letters may carry illuminating means, preferably employing tubes of radiant gas of the neon type. The wires connecting to the terminals of the sign should, of course, be given sufficient slack to permit the free movement of the letters.

It is also obvious that it is not essential to reciprocate the letters perpendicularly to the axis of the word. They could be reciprocated in an inclined direction if desired.

Instead of mounting letters on the letter carriers, I may mount sections of a figure; for example, a serpent or a dragon. When the carriers for these sections are operated, it is evident that the effect will produce a wave passing down the body of the animal represented by the figure.

It is understood that the embodiments of the invention described herein are only a few of the many embodiments this invention may take, and I do not wish to be limited in the practice of the invention, nor in the claims, to the particular embodiment set forth.

What I claim is:

1. In a moving sign, the combination of a plurality of parts forming a composite figure with its side disposed in a substantially vertical plane, means for supporting the parts, means for moving the said parts progressively to and fro in a substantially vertical direction and transverse to the longitudinal axis of the sign, and means cooperating therewith for progressively tilting the said parts in said substantially vertical plane, and with respect to the longitudinal axis of the sign to give the effect of a wave passing longitudinally through the sign.

2. In a moving sign, the combination of a plurality of letters forming a word, means for supporting the letters, means for moving the letters progressively to and fro in a vertical direction transverse to the longitudinal axis of the word, means cooperating therewith for progressively tilting the letters with respect to the longitudinal axis of the sign to give the effect of a wave passing longitudinally through the word, and means for counterbalancing the letters.

3. In a moving sign, the combination of an elongated frame, a plurality of letter-carriages mounted on said frame, means for guiding said letter-carriages to move transversely to the longitudinal axis of the frame, means for reciprocating the letter-carriages progressively on their guiding means, letters carried respectively by the letter-carriages, and forming a word, and means for progressively tilting the letters with respect to the longitudinal axis of the frame to give the effect of a wave passing through the word.

4. In a moving sign, the combination of an elongated frame-plate having a plurality of transverse slots therethrough, a plurality of letter-carriages, means for guiding the same at the back of the plate transversely to the longitudinal axis of the plate, letter-brackets supported on the carriages and capable of tilting thereon, letters carried respectively by the letter-brackets and forming a word, means for reciprocating the letter-carriages progressively on their guiding means, and means for progressively tilting the letters with respect to the longitudinal axis of the sign to give the effect of a wave passing through the word.

5. In a moving sign, the combination of an elongated frame-plate having a plurality of transverse slots therethrough, a plurality of letter carriages, means for guiding the same at the back of the plate transversely to the longitudinal axis of the plate, letter brackets pivotally supported on the carriages, means for progressively reciprocating the letter carriages on their guiding means, and means for progressively tilting the letters on their pivotal supports to give the effect of a wave passing longitudinally through the word formed by the letters.

6. In a moving sign, the combination of an elongated frame, a plurality of letter carriages mounted on said frame with means for guiding same to move transversely to the longitudinal axis of the frame, letters mounted to tilt respectively on the letter carriages, and cam-means corresponding to the different letter carriages operating to effect a progressive reciprocation of the carriages on the guiding means, and a tilting movement of the letters on the letter carriages, to give the effect of a wave passing longitudinally through the word formed by the letters.

7. In a moving sign composed of movable letters forming a word, the combination of a frame, a letter carriage, means for guiding the carriage on the frame in a direction transverse to the direction in which the word extends, a fixed cam, a connecting rod attached at one end to the letter carriage, a cam-follower rotatable about an axis and controlled by the cam, and means connecting said cam-follower with the other end of the connecting rod operating to decrease the angularity of the connecting rod when the letter carriage is at substantially mid-position in its travel; and a letter mounted on the carriage and controlled by the connecting rod so that the position of the connecting rod determines the tilted position of the letter.

8. In a moving sign composed of movable letters forming a word, the combination of a frame, a letter-carriage, means for guiding the carriage on the frame in a direction transverse to the direction in which the word extends, a fixed cam, a rotatable guide sleeve adjacent the cam, a cam bar guided through the guide sleeve and having means at one end engaging the cam and guided thereby, a connecting rod attached to the said cam bar at one end of the connecting rod and attached at the other end to the letter carriage to reciprocate the same when the guide sleeve is rotated, and a letter pivotally mounted to tilt on the letter carriage and connected with the connecting rod so that the angular position of the connecting rod determines the tilting of the letter.

9. In a moving sign composed of movable letters forming a word, the combination of a frame, a letter-carriage, means for guiding the carriage on the frame in a direction transverse to the direction in which the word extends, a fixed cam, a guide sleeve mounted to rotate adjacent the cam and having its own axis disposed in a plane substantially perpendicular to the plane of the cam, a cam-follower comprising a cam-bar guided to slide through the guide sleeve and having a roller at one end engaging the cam and guided thereby, a connecting rod attached at one end to the cam-bar on the opposite side of the sleeve from the roller and pivotally attached at its other end to the letter-carriage, a letter-bracket pivotally mounted on the letter-carriage and rigid with the connecting rod, and a letter carried thereby, said parts cooperating to reciprocate the carriage transversely to the frame and to tilt the letter on an axis on the carriage.

10. In a moving sign composed of movable letters forming a word, the combination of an elongated substantially horizontal frame, a letter-carriage, means for guiding the letter-carriage in a substantially vertical direction on the said frame, a fixed cam, a guide sleeve mounted on the axis of the cam, and having its own axis disposed in a plane substantially perpendicular to the plane of the cam, a cam-follower including a cam-bar guided to slide through the guide sleeve and having a roller at one end engaging the cam and guided thereby, a connecting rod pivotally attached at one end to the said cam-bar and pivotally attached at its other end to the letter-carriage, a letter-bracket pivotally mounted on the letter-carriage, a letter carried thereby, means connecting the letter-bracket with the connecting rod so that as the connecting rod reciprocates the carriage it tilts the letter on the letter-carriage.

11. In a moving sign composed of movable letters forming a word, the combination of a frame, a letter-carriage, means for guiding the carriage on the frame in a direction transverse to the direction in which the word extends, a cam elongated on a diameter thereof, means for reciprocating the letter carriage, a letter pivotally mounted on the letter-carriage, a cam-follower running in the cam, means connecting the same with the letter to cause the letter to tilt on its carriage, and resilient means for urging the cam-follower along the cam at the ends of the cam.

12. In a moving sign composed of movable letters forming a word, the combination of a frame, a letter carriage, means for guiding the carriage on the frame in a direction transverse to the direction in which the word extends, means for reciprocating the carriage on its guiding means, a relatively fixed cam, a letter mounted on the letter-carriage and capable of tilting thereon, a cam-follower running in the cam and connected with the letter for tilting the same progressively as the carriage reciprocates.

13. In a movable sign composed of movable letters forming a word, the combination of a frame, a letter-carriage, means for guiding the carriage on the frame in a direction transverse to the direction in which the word extends, means for reciprocating the carriage on its guiding means, a relatively fixed cam, a letter mounted on the letter-carriage and capable of tilting thereon, a cam-follower running in the cam and connected with the letter for tilting the same progressively as the carriage reciprocates, said cam being elongated in the direction in which the carriage reciprocates; and means cooperating with the cam-follower to urge the cam-follower forwardly at the ends of the cam.

14. In a moving sign composed of movable letters forming a word, the combination of a frame, a letter-carriage, means for guiding the carriage on the frame in a direction transverse to the direction in which the word extends, means for reciprocating the carriage on its guiding means, a relatively fixed cam, a letter mounted on the letter-carriage and capable of tilting thereon, a cam-follower including a bell-crank lever having an arm with means running in the cam, said letter and said bell-crank lever mounted to rock on the said carriage, said bell-crank lever having a second arm; and spring-urged bumpers at the ends of the travel of the carriage for engaging the second-named arm of the bell-crank lever for urging the cam-follower forwardly at the ends of the cam, the said cam being elongated in the direction in which the carriage reciprocates.

15. In a movable sign composed of movable letters forming a word, the combination of a frame, a letter-carriage, means for guiding the carriage on the frame transversely to the direction in which the word extends, said carriage including a body with rollers running on said guiding means and including a slide movable relatively to the body, said slide having guiding means engaging the outer sides of said rollers, a letter mounted to tilt on the letter-carriage, and means for reciprocating the carriage and for tilting the letter.

16. In a moving sign, the combination of a plurality of parts forming a composite figure with its side disposed in a substantially vertical plane, means for supporting the parts, means for moving the said parts progressively to and fro in a substantially vertical direction and transverse to the longitudinal axis of the sign, and means distinct from the supporting means for positively guiding the said parts in said substantially vertical plane to tilt the said parts progressively during said to and fro movement to give the effect of a wave passing longitudinally through the sign.

17. In a moving sign, the combination of a plurality of letters forming a word, means for supporting the letters, means for moving the letters progressively to and fro in a vertical direction transverse to the longitudinal axis of the word, means distinct from the supporting means for positively guiding the said letters to tilt the same progressively during said to and fro movement and thereby giving the effect of a wave passing longitudinally through the word; and means for counterbalancing the letters.

18. In an animated display, the combination of a plurality of spaced characters disposed along a longitudinal axis; driving means; supporting means individually supporting each character; a plurality of similar driving linkages actuated by the driving means and progressively moving the characters individually over similar paths each having a component substantially transverse to said axis; means cooperating with each of the linkages progressively tilting said characters individually about a transverse axis transverse to both said longitudinal axis and said components; means drivingly connecting the drive means with the drive linkages and the tilting means to maintain the characters in predetermined out of phase positions with respect to each other to produce the appearance of a wave-like motion passing longitudinally along the successive characters.

ROLLA B. FERREBY.